(12) United States Patent
Shankar et al.

(10) Patent No.: US 12,242,505 B1
(45) Date of Patent: Mar. 4, 2025

(54) RECOVERING FROM INTERRUPTIONS IN DATABASE REPLICATION STREAMS

(71) Applicant: Amazon Technologies, Inc., Seattle, WA (US)

(72) Inventors: Ramesh Shankar, Redmond, WA (US); Raman Mittal, Kirkland, WA (US); Minsoo Oh, Seattle, WA (US); Andrew Willis Callahan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 45 days.

(21) Appl. No.: 18/194,568

(22) Filed: Mar. 31, 2023

(51) Int. Cl.
*G06F 16/27* (2019.01)

(52) U.S. Cl.
CPC .................... *G06F 16/27* (2019.01)

(58) Field of Classification Search
CPC ........................................................ G06F 16/27
See application file for complete search history.

(56) References Cited

U.S. PATENT DOCUMENTS

| | | | |
|---|---|---|---|
| 7,668,878 B2 | 2/2010 | Arora et al. | |
| 10,318,648 B2 | 6/2019 | Diaconu et al. | |
| 10,761,946 B2* | 9/2020 | Bensberg | G06F 11/1441 |
| 10,929,428 B1* | 2/2021 | Brahmadesam | G06F 16/2379 |
| 12,007,977 B1* | 6/2024 | Singh | G06F 16/27 |
| 2018/0150540 A1* | 5/2018 | Florendo | G06F 16/273 |
| 2018/0246947 A1* | 8/2018 | Florendo | G06F 16/2379 |
| 2021/0326359 A1* | 10/2021 | Upton | G06F 3/065 |

* cited by examiner

*Primary Examiner* — Jared M Bibbee
(74) *Attorney, Agent, or Firm* — S. Scott Foster; Kowert, Hood, Munyon, Rankin & Goetzel, P.C.

(57) ABSTRACT

Interruptions in an ordered replication stream can be received from in a database. A database instance of the ordered replication stream may detect missing log records and then evaluate log records that are subsequently received to determine whether to update a portion of an in-memory data structure for performing database requests using a comparison of sequence numbers of the last update corresponding to the portion of the in-memory data structure indicated in the log record and the last update recorded for the portion of the in-memory data structure. For comparison indicating valid portions, the log record can be used and for comparison indicating invalid portions, the portion of the in-memory data structure can be made unavailable.

20 Claims, 7 Drawing Sheets

RECOVERING FROM INTERRUPTIONS IN DATABASE REPLICATION STREAMS

BACKGROUND

Commoditization of computer hardware and software components has led to the rise of service providers that provide computational and storage capacity as a service. At least some of these services, such as database services, are implemented in distributed fashion in order to provide durability and availability of data. In this way, workloads for client applications can be distributed amongst multiple components of a distributed database system in order to provide consistent performance.

Figure 1:
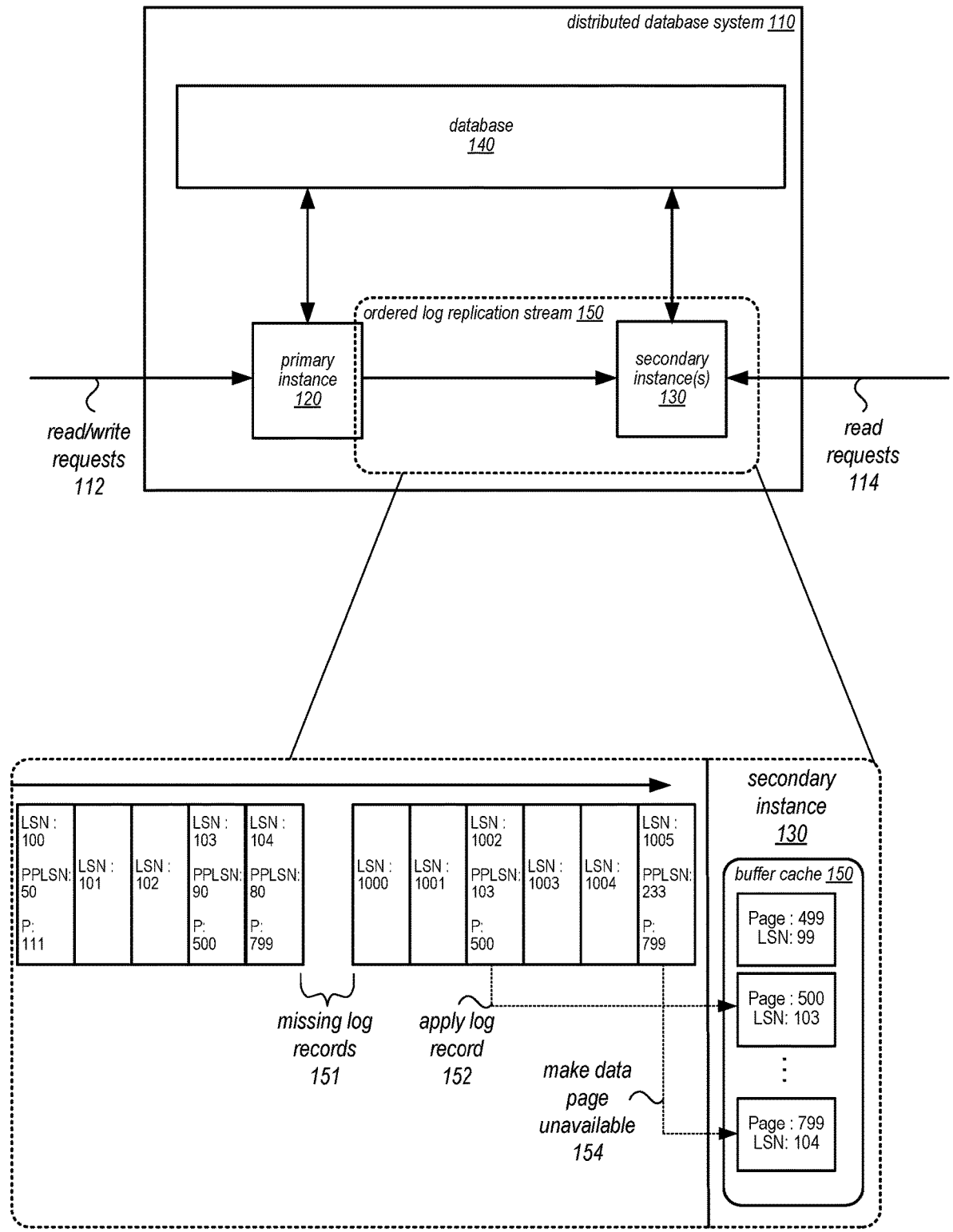
FIG. 1 is a logical block diagrams illustrating recovering from interruptions in database replication streams, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of recovering from interruptions in database replication streams are described herein. Distributed database systems may provide multiple access locations to a database in order to improve the availability and performance of the distributed database system to perform access requests. In order to ensure that the database data used to perform the access requests at the different access locations, replication techniques may be implemented. For some distributed database systems, the workload of the distributed database system may influence the use of a particular replication technique. A high write workload, for instance, may rely upon replication techniques that do not interfere with the performance of writes but keep up with the large numbers of updates that the high write workload causes.

In some embodiments, streaming database replication techniques may be used to update different distributed database access locations, which may not interfere with the performance of writes and keep up with the large number of updates. Streaming database replication techniques may rely upon a stream of log records or other indications of updates that are performed to a database. Because the stream of log records may be used to support distributed database system guarantees, such as Atomicity Consistency Isolation and Durability (ACID) compliance, an ordering for applying the stream of log records may be strictly enforced to ensure that updates are correctly applied and exposed to database access requests.

Because the application of the stream of log records for replication may rely upon the ordering for correctness, missing log records in the stream can create errors that may violate distributed database system guarantees. As many different scenarios can result in missing log records in the stream in a distributed database system (e.g., because of network or distributed database system component disruptions), techniques for recovering from interruptions in database replication streams are highly desirable to avoid more access location downtime in a distributed database system.

FIG. 1 is a logical block diagrams illustrating recovering from interruptions in database replication streams, according to some embodiments. In FIG. 1, distributed database system 110 may be a stand-alone database system (e.g., implemented on private network systems or services or implemented by a user of a cloud or other provider network, like the provider network discussed in detail below with regard to FIG. 2). In some embodiments, distributed database system 110 may be database service, like database service 210 discussed in detail below with regard to FIGS. 2-5, which may be implemented and managed by a provider network. Distributed database system 110 may be one of many different types of database, including types that support different kinds of access to database data, such as through the use of a query language like Structured Query Language (SQL) or APIs or other commands that provide a NoSQL interface. Different types of databases may store data for the database in different formats and according to different data models. For instance, one type of database may use a relational data model that imposes a common schema for a table of the relational database and another type of database may use a non-relational data model that imposes a flexible schema, which may not be common across different items or objects in the database. Databases may store various types of data including, but not limited to, graph databases storing data using a graph data model, time series databases storing time series data, key-value database that use a unique key-value to lookup data objects of various data types or formats in the database, or document databases that store data as a document with varying attributes, including nested data.

Distributed database 110 may store database 140 in a storage system which may be attached or accessible to primary instance 120 and secondary 130. In some embodiments, a non-distributed storage system may be implemented to store database 140. In other embodiments, database 140 may be stored in a distributed data storage system, such as storage service 220 discussed below with regard to FIGS. 2-5. Instances engines, such as primary instance 120 and secondary 130 may be implemented as instances, nodes, or other independent applications that include a query engine and/or other components that receive and perform requests to access database 140, in various embodiments. For instance, as discussed below with regard to FIG. 3, query engines can be implemented as instances on respective host systems. In some embodiments, these host systems may be distributed (e.g., in different data centers or other different locations, such as on different server racks) so as to avoid common failure scenarios where both host systems may have correlated or simultaneous failure.

As depicted in FIG. 1, primary instance 120 and secondary instance 130 may have respectively assigned roles for handling database requests. Such roles may include a read-write role, which allows for performing requests 112 that both read from and write to database 140, and read-only, which may perform requests 114 that read from database 140. While database 140 may serve as a source of truth for secondary instance(s) 130, to keep up with frequent writes to database 140, an ordered log replication stream 150 may be implemented between primary instance 120 and secondary instance(s) 130. The ordered log replication stream 150 may include log records that describe respective updates to database 140 made as part of performing write requests 112, as well as (in some embodiments) various other command, control, or management information that may be shared between instances.

As long as no interruptions occur in ordered log replication stream 150, secondary instance(s) 130 can apply the log records to update local data for secondary instance(s) 130, such as in-memory data structures which are used to perform read requests at the secondary instance. Different types of query engines may rely upon different types of in-memory data structures, which may include but are not limited to, buffer cache, overlay, fileover, commit log, multi-transaction log, and commit timestamp metadata. One such example is illustrated and discussed below: a buffer cache. However, the techniques discussed with regard to a buffer cache can be applied to other in-memory data structures as well.

To illustrate the benefits of improved recovery techniques, buffer cache 150 which stores data pages of database 140 in memory in order to quickly serve read requests 114 without having to access database 140 is illustrated. If an interruption does occur, however, then missing log records could otherwise render the ability of secondary instance(s) 130 to use ordered log replication stream 150 inoperable, which could cause recovery operations that include restarting secondary instance(s) 130 resulting in a loss of connections to client applications, failure of read requests 114, and other disruptions to other systems that interact with secondary instance(s) 130.

In various embodiments, database instances, such as secondary instance(s) 130, may implement techniques that recover from interruptions in database replication streams without costly restarts or other actions that disconnect or otherwise disrupt client applications. For example, secondary instance 130 may implement in-memory data structure recovery management techniques that will make use of those received log records in ordered log replication stream 150 which are still useable and discard those log records which are not. For example, as illustrated in FIG. 1, a number of missing log records 151 can be identified in the ordered log replication stream. Instead of attempting to obtain the missing log records from primary instance 120, which may be time consuming and may cause the number of log records that have to be stored in memory at secondary instance 130 to exceed allocated space for log records and which may be disruptive to the operations of primary instance 120, secondary instance can make individual determinations for log records that occur after the missing log records in the stream 150 (e.g., records with log sequence numbers (LSN) 1000 or greater) as to whether they are applicable. For instance, as indicated at 152, a log record (LSN) 1002 may target for an update page (P) 500. In buffer cache 150 page 500 is maintained with an LSN of 103, indicating that a last update made to page 500 had an LSN of 103 (also illustrated earlier in replication stream 150). Because the previous page LSN (PPLSN) of the log record 1002 is 103, then there is no missing information for page 500 in missing log records and the log record can be used to modify page 500 in buffer cache 150.

In another example illustrated at 154, a log record LSN 1005 updates page 799. In buffer cache page 799 has an LSN of 104. LSN 104 is different from PPLSN 233 in the log record. Therefore, it can be known that the data in page 799 is not consistent with the data in database 140 and can be made unavailable. Different techniques, such as marking pages stale, evicting pages, overwriting pages, or other techniques may be used to make a data page unavailable in buffer cache 150.

Please note, FIG. 1 is provided as a logical illustration of a distributed database system and its respective components, as well as respective interactions and is not intended to be limiting as to the physical arrangement, size, or number of components, modules, or devices to implement such features. For example, cross region replication techniques may also involve replication streams and recovery may be performed in cross region replication scenarios.

The specification continues with an example network-based database service implemented as part of a provider network that performs recovering from interruptions in database replication streams. Included in the description of the example database service are various aspects of the example database service, such as a database instance, and a separate storage service. The specification then describes flowcharts of various embodiments of methods for recovering from interruptions in database replication streams. Next, the specification describes an example system that may implement the disclosed techniques. Various examples are provided throughout the specification.

Figure 2:
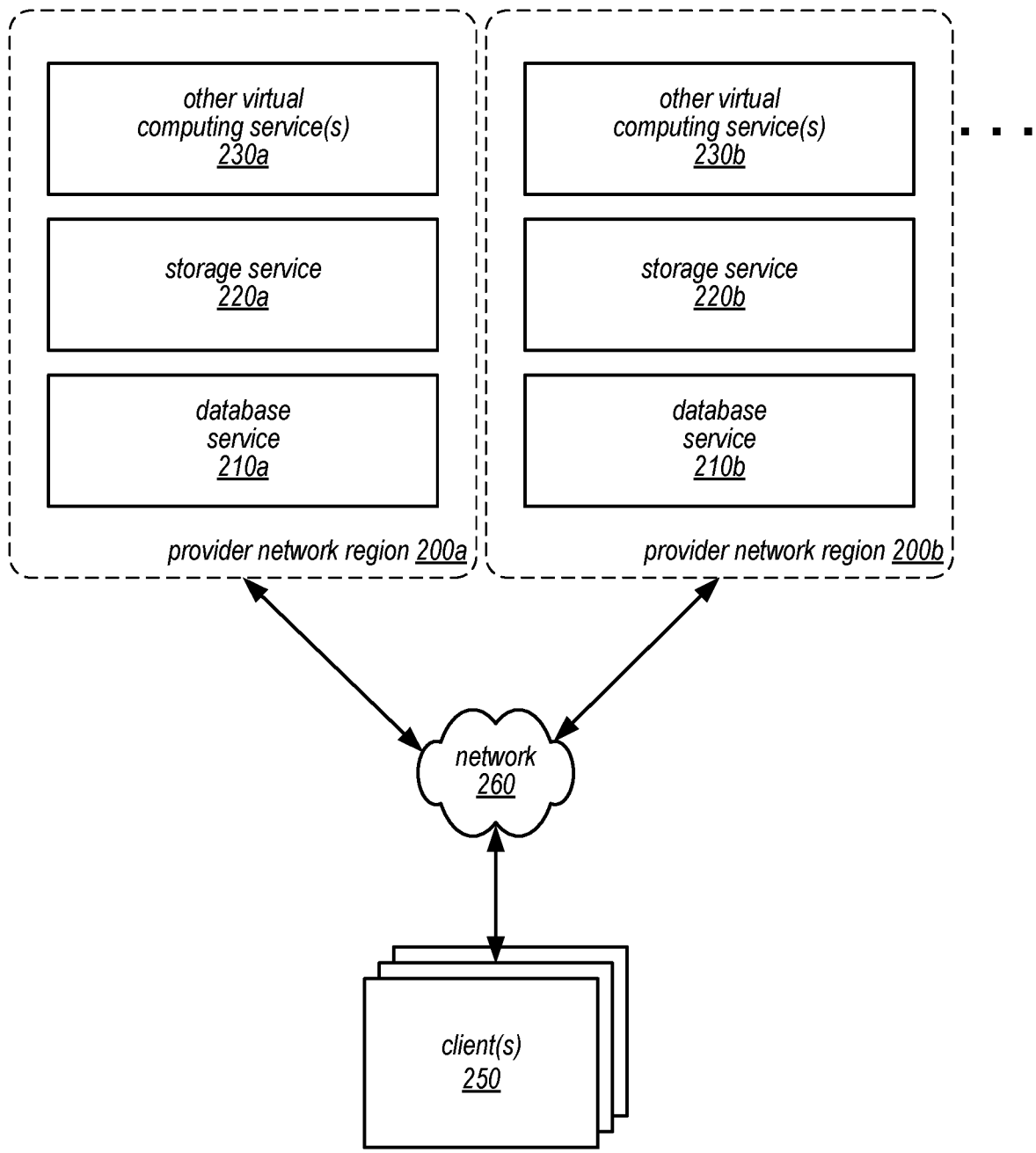
FIG. 2 is a block diagram illustrating provider network regions that may implement database services that implement techniques for recovering from interruptions in database replication streams, according to some embodiments.

FIG. 2 is a block diagram illustrating provider network regions that may implement database services that implement techniques for recovering from interruptions in database replication streams, according to some embodiments. A provider network (sometimes referred to as a "cloud provider network" or "cloud") refers to a pool of network-accessible computing resources (such as compute, storage, and networking resources, applications, and services), which may be virtualized or bare-metal. The provider network can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the provider network via a publicly accessible network (e.g., the Internet, a cellular communication network) by way of a transit center (TC). TCs can be considered as the primary backbone locations linking users to the provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The provider network may deliver content from points of presence outside of, but networked with, these regions by way of edge locations and regional edge cache servers (points of presence, or PoPs). This compartmentalization and geographic distribution of computing hardware enables the provider network to provide low-latency resource access to users on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the provider network, which may be provisioned in user accounts.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As depicted in FIG. 2, an exemplary provider network may include numerous provider network regions 200a, 200b, and so on that may include one or more data centers hosting various resource pools, such as collections of physical and/or virtualized computer servers, storage devices, networking equipment and the like (e.g., computing system 1000 described below with regard to FIG. 7), needed to implement and distribute the infrastructure and storage services offered by the provider network within the provider network regions 200.

In the illustrated embodiment, a number of clients (shown as clients 250 may interact with a provider network 200 via a network 260. Provider network may implement respective instantiations of the same (or different) services, a database service 210a for region 200a and database service 210b for region 200b, a storage service 220a for region 200a and storage service 220b for region 200b, as well as various other virtual computing services 230a and 230b respectively. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to one or more of provider network regions 200a or 200b via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with service of a region of a provider network. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within a service of the provider network (e.g., a client application of database service 210a may be implemented on one of other virtual computing service(s) 230a in region 200a), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database data to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to the provider network may be coordinated by client 250 and the operating system or file system on behalf of applications executing within the operating system environment.

Clients 250 may convey network-based services requests to and receive responses from a region of the provider network via network 260. In various embodiments, network 260 may encompass any suitable combination of networking hardware and protocols necessary to establish network-based communications between clients 250 and provider network regions 200a and 200b. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and the provider network region may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network regions 200a and 200b. It is noted that in some embodiments, clients 250 may communicate with regions of a provider network using a private network rather than the public Internet. For example, clients 250 may be provisioned within the same enterprise as a database service. In such a case, clients 250 may communicate with a provider network region entirely through a private network 260 (e.g., a LAN or WAN that may use Internet-based communication protocols but which is not publicly accessible).

Generally speaking, provider network regions 200a and 200b may implement one or more service endpoints may receive and process network-based services requests, such as requests to access a database (e.g., queries, inserts, updates, etc.) and/or manage a database (e.g., create a database, configure a database, etc.). For example, a provider network region may include hardware and/or software may implement a particular endpoint, such that an HTTP-based network-based services request directed to that endpoint is properly received and processed. In one embodiment, a provider network region may be implemented as a server system may receive network-based services requests from clients 250 and to forward them to components of a system that implements database service 210a or 210b, storage service 220a or 220b and/or another virtual computing service 230a or 230b for processing. In other embodiments, provider network region may be configured as a number of distinct systems (e.g., in a cluster topology) implementing load balancing and other request management features may dynamically manage large-scale network-based services request processing loads. In various embodiments, a provider network region may be may support REST-style or document-based (e.g., SOAP-based) types of network-based services requests.

In addition to functioning as an addressable endpoint for clients' network-based services requests, in some embodiments, a provider network region may implement various client management features. For example, provider network region 200a may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network regions may also implement financial accounting and billing systems, or may maintain a database of usage data that may be queried and processed by external systems for reporting and billing of client usage activity. In certain embodiments, provider network regions may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210*a* or 210*b*, storage service 220*a* or 220*b* and/or another virtual computing service 230*a* or 230*b* (or the underlying systems that implement those services).

In some embodiments, provider network regions may also implement user authentication and access control procedures. For example, for a given network-based services request to access a particular database table, a provider network region ascertain whether the client 250 associated with the request is authorized to access the particular database table. Provider network regions may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, the provider network region may reject the corresponding network-based services request, for example by returning a response to the requesting client 250 indicating an error condition. Various access control policies may be stored as records or lists of access control information by database services 210*a* or 210*b*, storage services 220*a* or 220*b* and/or other virtual computing services 230*a* or 230*b*.

Note that in many of the examples described herein, services, like database service or storage service may be internal to a computing system or an enterprise system that provides database services to clients 250, and may not be exposed to external clients (e.g., users or client applications). In such embodiments, the internal "client" (e.g., database service 210*a*) may access storage service 220*a* over a local or private network (e.g., through an API directly between the systems that implement these services). In such embodiments, the use of storage service 220*a* in storing database tables on behalf of clients 250 may be transparent to those clients. In other embodiments, storage services 220*a* or 220*b* may be exposed to clients 250 through provider network region 200*a* or 200*b* to provide storage of database tables or other information for applications other than those that rely on database service 210*a* or 210*b* for database management. In such embodiments, clients of the storage service 220*a* or 220*b* may access storage service 220*a* or 220*b* via network 260 (e.g., over the Internet). In some embodiments, a virtual computing service 230*a* or 230*b* may receive or use data from storage service 220*a* or 220*b* (e.g., through an API directly between the virtual computing service 230*a* or 230*b* and storage service 220*a* or 220*b*) to store objects used in performing computing services 230*a* or 230*b* on behalf of a client 250. In some cases, the accounting and/or credentialing services of provider network region may be unnecessary for internal clients such as administrative clients or between service components within the same enterprise.

Figure 3:
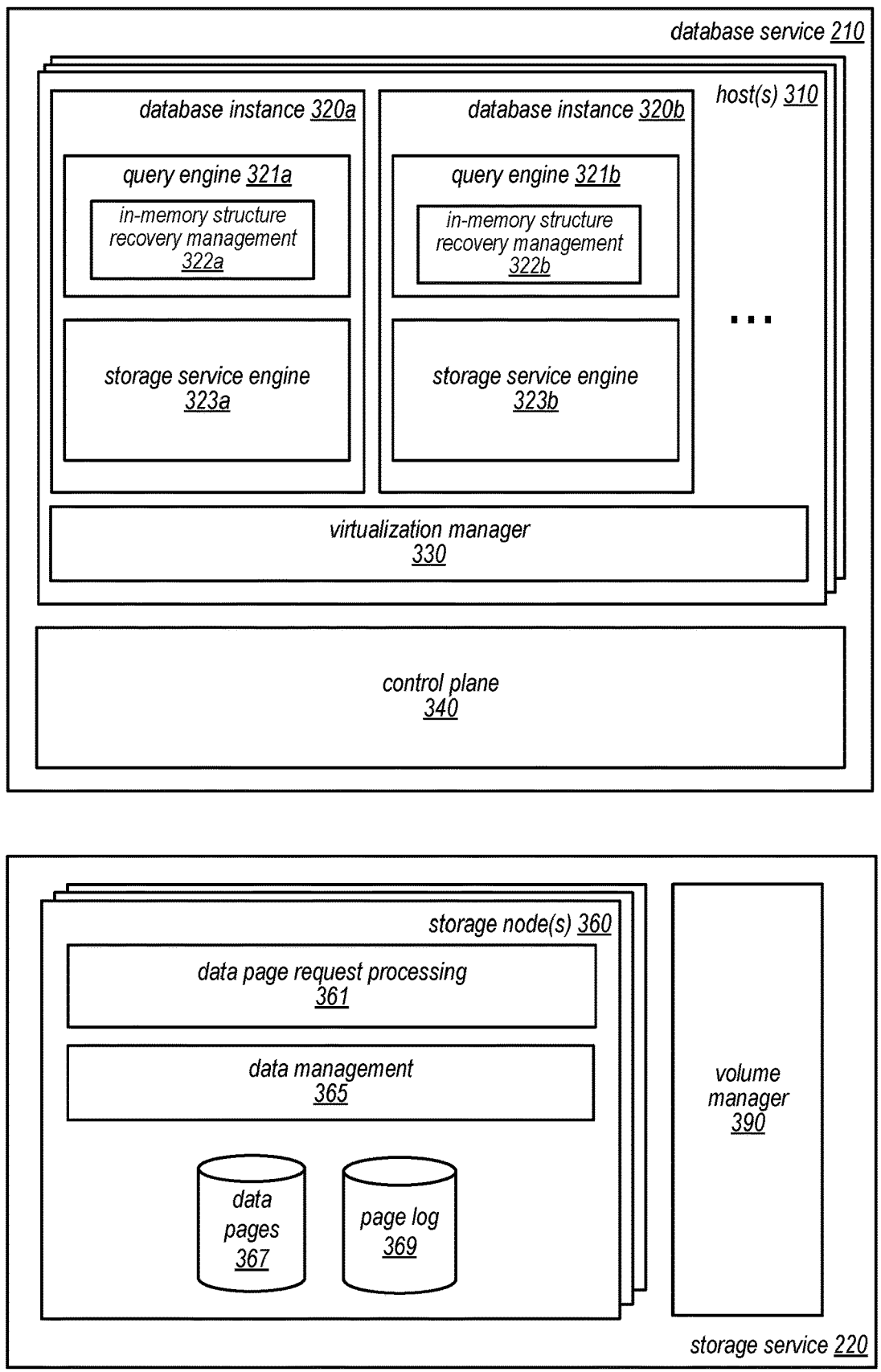
FIG. 3 is a block diagram illustrating various components of a database service and storage service that host databases accessible to database clients, according to some embodiments.

FIG. 3 is a block diagram illustrating various components of a database service and storage service that provides access to a database, according to some embodiments. Database service 210 (instantiated as database service 210*a* in region 200*a* and 210*b* in region 200*b*) may implement control plane 340 which may manage the creation, provisioning, deletion, or other features of managing a database hosted in database service 210. For example, control plane 340 may monitor the performance of host(s) 310 (e.g., a computing system or device like computing system 1000 discussed below with regard to FIG. 7) for high workloads (e.g., heat) and move or redirect placement of database engine head node instances away from some hosts to avoid overburdening host(s) 310. Control plane 340 may handle various management requests, such as request to create databases, manage databases (e.g., by configuring or modifying performance, such as by enabling a "serverless" or other automated management feature in response to a request which may cause in-place resource scaling to be enabled for that database. Control plane 340 may direct placement of database engine head node instances on host(s) 310 so as to distribute workload across host(s) 310 to avoid failure scenarios, like out-of-memory. As discussed in detail below with regard to FIGS. 7A-8, control plane 340 may implement query engine upgrade management 342 to implement techniques for minimizing connection loss when changing database query engine versions.

Database service 210 may implement one or more different types of database systems with respective types of query engines for accessing database data as part of the database. For example, database service 210 may implement various types of connection-based (e.g., having established a network connection between a database client and database instance 320) database systems which may, for instance, facilitate the performance of various operations that continue over multiple communications between the database client and the connected database instance 320. In at least some embodiments, database service 210 may be a relational database service that hosts relational databases on behalf of clients.

Database service 210 may implement a fleet of host(s) 310 which may provide, in various embodiments, a multi-tenant configuration so that different database instances, such as database instance 320*a* and 320*b*, can be hosted on the same host 310, but provide access to different databases on behalf of different clients over different connections. In some embodiment hosts(s) 310 may not be multi-tenant.

In various embodiments, host(s) 310 may implement a virtualization technology, such as virtual machine based virtualization or container-based virtualization, wherein database instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) 310 may implement virtualization manager 330, which may support hosting one or multiple separate database engine head node instances 320 as different respective VMs, microVMs, or containers. Virtualization manager 330 may support increasing or decreasing resources made available to host(s) 310 to use for other tasks (including other database instance(s) 320) that were allocated to a database instance 320 upon creation at host(s) 310.

Database instance(s) 320 may support various features for accessing a database, such as query engine(s) 321*a* and 321*b*, and storage service engine(s) 323*a* and 323*b*. As discussed in detail above with regard to FIG. 1 and below with regard to FIGS. 5-6, database instances (e.g., as part of query engines 321*a* and 321*b*) may implement respective in-memory structure recovery management 322*a* and 322*b* which may perform recovery from interruptions in data replication streams on in-memory data structures, as discussed in detail below with regard to FIGS. 4-6.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage.

For example, data may be organized in various logical volumes, segments, and pages for storage on one or more storage nodes 360 of storage service 220. For example, in some embodiments, each database may be represented by a logical volume, and each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
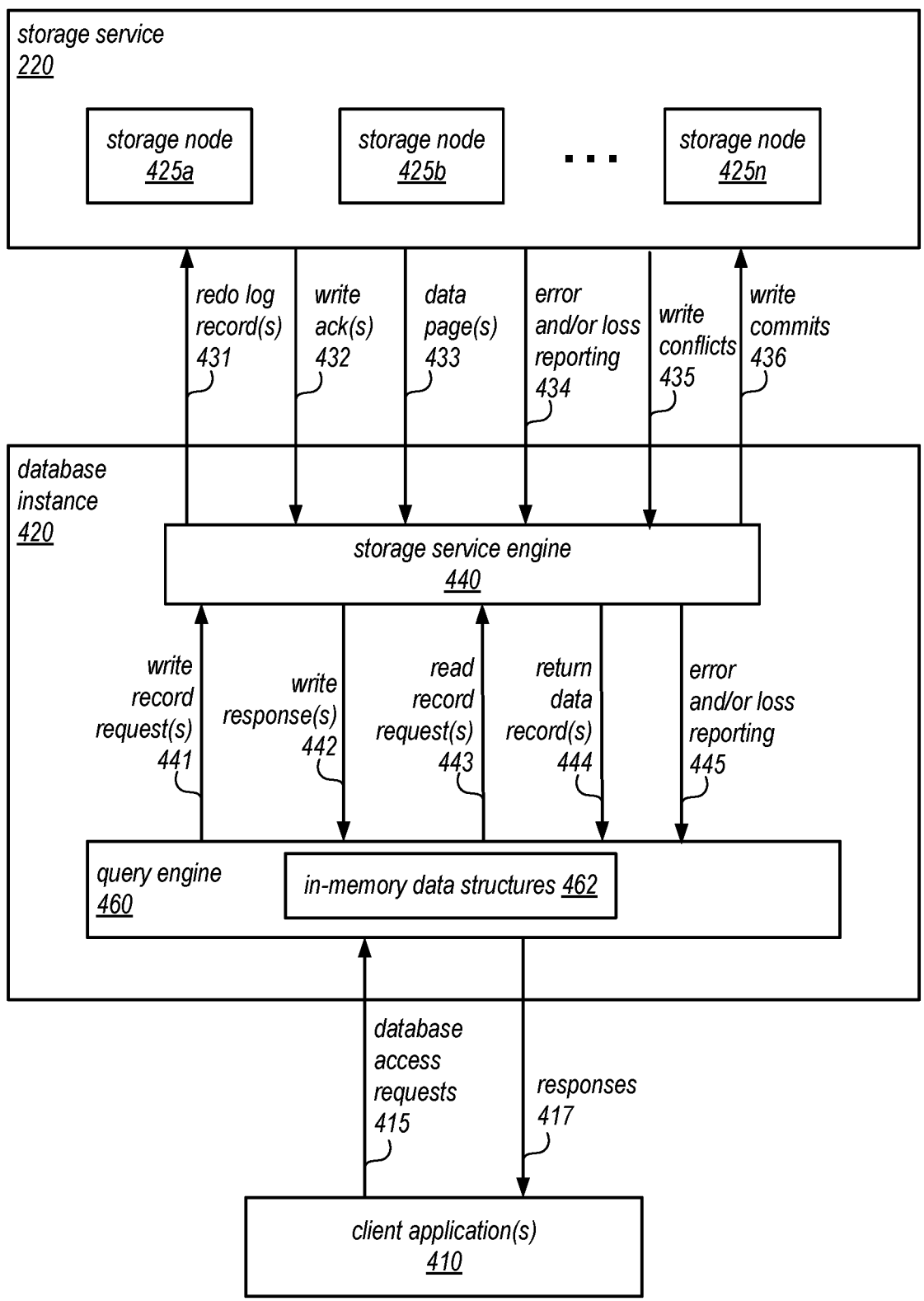
FIG. 4 is a block diagram illustrating the interactions between a database service and separate storage service, according to some embodiments.

FIG. 4 is a block diagram illustrating various interactions to handle database client requests, according to some embodiments. In this example, one or more client application(s) 410 may store data to one or more databases maintained by a database system that includes a database instance 420 and a storage service 220. In the example illustrated in FIG. 4, database instance 420 includes query engine 460 and storage service engine 440 (which serves as the interface between storage service 220 and query engine 460). In some embodiments, query engine 460 may perform functions such as query parsing, optimization and execution, and transaction and consistency management component, and/or may store data pages, transaction logs and/or undo logs.

In this example, one or more client application(s) 410 may send database access requests 415 (which may include read and/or write requests targeting data stored on one or more of the storage nodes 435a-435n) to query engine 460, and may receive responses 417 from query engine 460 (e.g., responses that include write acknowledgements and/or requested data). Each database access request 415 that includes a request to write to a page may be parsed and optimized to generate one or more write record requests 441, which may be sent to storage service engine 440 for subsequent routing to storage service 220. In this example, storage service engine 440 may generate one or more redo log records 431 corresponding to each write record request 441, and may send them to specific ones of the storage nodes 435 of storage service 220. Storage service 220 may return a corresponding write acknowledgement 423 for each redo log record 431 to database instance 420 (specifically to storage service engine 440). Storage service engine 440 may pass these write acknowledgements to query engine 460 (as write responses 442), which may then send corresponding responses (e.g., write acknowledgements) to one or more client applications 410 as one of database responses 417.

In this example, each database access request 415 that includes a request that causes a read of a data page may be parsed and optimized to generate one or more read record requests 443, which may be sent to storage service engine 440 for subsequent routing to storage service 220. In this example, storage service engine 440 may send these requests to specific ones of the storage nodes 435 of storage service 220, and storage service 220 may return the requested data pages 433 to database instance 420 (specifically to storage service engine 440). Storage service engine 440 may send the returned data pages to the query engine 460 as return data records 444, and query engine 460 may then send the data pages to one or more client application(s) 410 as database responses 417. Note that query engine 460 may implement several in-memory data structures 462, such as buffer cache which can be used to obtain data pages for a query or other access request instead of sending read record request(s) 443 to storage service engine. Other exemplary in-memory data structures may include overlay, fileover, commit log, multi-transaction log, and commit timestamp metadata. that maps the logical space of stored data to physical storage block offsets, which can be updated as data volume geometry and mappings change.

In some embodiments, various error and/or data loss messages 434 may be sent from storage service 220 to database instance 420 (specifically to storage service engine 440). These messages may be passed from storage service engine 440 to query engine 460 as error and/or loss reporting messages 445, and then to one or more client application(s) 410 along with (or instead of) a database response 417.

In some embodiments, the APIs 431-434 of storage service 220 and the APIs 441-445 of storage service engine 440 may expose the functionality of the storage service 220 to database instance 420 as if database instance 420 were a client of storage service 220. For example, database instance 420 (through storage service engine 440) may write redo log records or request data pages through these APIs to perform (or facilitate the performance of) various operations of the database system implemented by the combination of database instance 420 and storage service 220 (e.g., storage, access, change logging, recovery, and/or space management operations). As illustrated in FIG. 4, storage service 220 may store data blocks on storage nodes 425a-425n, each of which may have multiple attached SSDs. In some embodiments, storage service 220 may provide high durability for stored data block through the application of various types of redundancy schemes.

Note that in various embodiments, the API calls and responses between database instance 420 and storage service 220 (e.g., APIs 431-434) and/or the API calls and responses between storage service engine 440 and query engine 460 (e.g., APIs 441-445) in FIG. 4 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database instance 420 and/or storage service 220.

Figure 5:
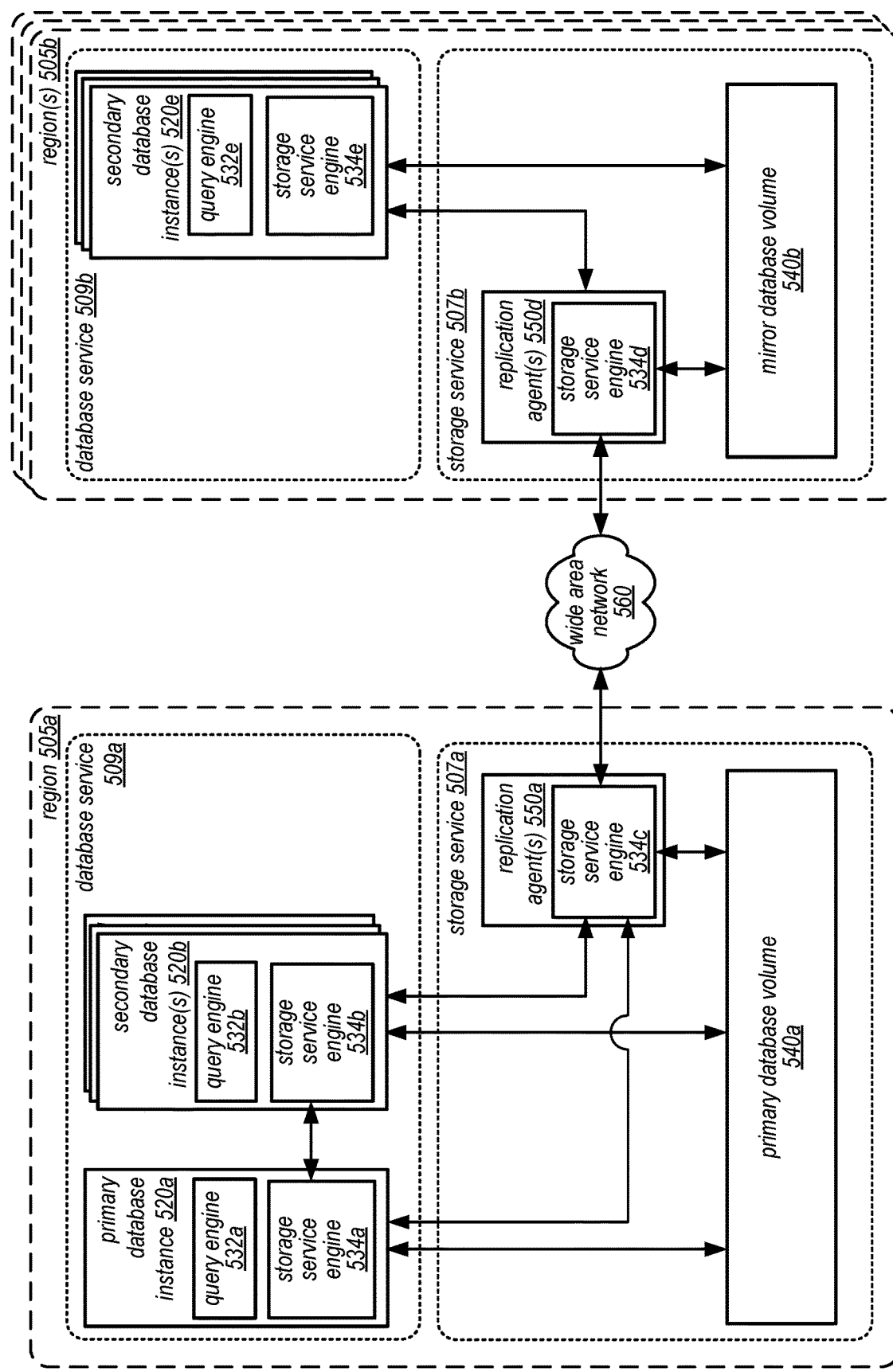
FIG. 5 is a block diagram illustrating cross region replication for a database hosted in a database service that implements recovering from interruptions in database replication streams across regions, according to some embodiments.

As discussed above with regard to FIG. 1, in some embodiments, a database may be replicated according to different techniques for different locations. Replication of changes made by a primary database instance with assigned read-write permissions to a secondary database instance in a same region with read-only permissions may be different than a mirrored copy of the database maintained in a different region. FIG. 5 is a block diagram illustrating cross region replication for a database hosted in a database service, according to some embodiments. Various ones of the components illustrated in FIG. 5 may be implemented via various computer systems (e.g., such as the computer system illustrated in FIG. 7, described below).

In this illustrated example, multiple clusters of one or more database instances may be hosted in respective services in database services 509a and 509b in region 505a and region(s) 505b to provides database services to clients that access the databases in the different regions. It should be noted that, while the illustrated example shows one remote cluster, any number of remote clusters may be employed. Similarly, one or multiple database instances may be implemented within each database service for a database, in some embodiments. Multiple database instances, as discussed above with regard to FIGS. 2-5, such as primary database instance 520a and secondary database instance(s) 520b may be implemented as part of database service 509a to provide access to a database stored in storage service 507a, in primary database volume 540a. Primary database instance 520a may provide read and write capabilities to the database, utilizing query engine 532a and storage service engine 534a, as well as offering additional read capacity via secondary database instances(s) 520b, which includes a respective query engines 532b and storage service engines 534b.

Storage service 507a may also implement a replication agent(s) 550a which may act as a reverse proxy, among other features, to replicate changes made to the database at primary database volume 540a to a mirror database volume 540b stored in storage service 507b in region 505b. Note that other regions may also implement mirror database volumes in respective storage services. Replication agent(s) 550a may implement a storage service engine 534c to perform the various techniques discussed below. Similarly, storage service 507 (b) may implement replication agent(s) 540d, which may include storage service engine 534d to perform the below replication techniques while minimizing the time that mirror database volume is unable to be accessed by secondary database instance 520e (via query 532e and storage service engine 534e), in some embodiments. In some embodiments, multiple replication agents may be assigned to replicating changes to database copies (e.g., 2 replication agents for source database and database copy).

In some embodiments, storage service engine 534 may implement a one or more streams of information to assist in synchronizing updates between database volumes and head nodes. For example, storage service engine 534a may send a replication stream of log records for writes performed by primary database instance 520a to storage service engine 534b of secondary database instance 520b as well as to storage service engine 534c of replication agent 550a. Replication agent(s) 550a can function as an additional replica node of the database in database service 509a, in some embodiments. Replication agent 550 may forward the log records received from the storage service engine 534a to the storage service engine 534d of the replication agent 550d over wide area network 560 (which may be a public network, in some embodiments) where the replication agent 550d may function as single writer for mirror database volume 540b. In this way, performance of the database in database service 509a is minimally degraded yet the access to mirror database volume 540b can provide a consistent read view of the database with minimal latency, in some embodiments.

As the communications between replication agents may occur over wide area network 560, various security protocols may be implemented. For example, SSL or other TLS security techniques may be implemented to safeguard or otherwise encrypt data being transmitted over wide area network 560 (e.g., log records or pages as discussed below).

In some embodiments, replication agent(s) 550 may implement a log cache which may store log records from the log stream. In this way, if communication failures (e.g. dropped packets, network partitions) or other interruptions cause some log records to be missed in inter-storage service engine log replication, then the log cache may be able to supply the missing records without having to go to other locations. For example, replication agent(s) may be able get cached log records from log cache, in some embodiments. Although not illustrated, in some embodiments, replication agent(s) 550 may implement a cache of log records (e.g., for one or multiple secondary database engine head nodes to access in order to perform other operations).

Replication agent(s) 550 may also be able to access a redo log of a primary database volume 540a if the cache would not have the missing redo log records. For example, replication agent(s) 550 may be performing a catch-up or re-mirror technique in order to obtain missing updates that were not received as part of the inter-storage service engine log replication stream, in some embodiments. Instead, replication agent(s) 550 may submit a request to get stored log records which replication agent(s) 550 may perform in order to obtain the request log records from primary database volume 540a.

Similarly, replication agent(s) 550 may also be able to request data pages from data pages stored as part of primary database volume 540a. For example, replication agent(s) 550 may be performing a catch-up or re-mirror technique in order to obtain missing updates that were not received as part of the inter-storage service engine log replication stream, not present in the log cache or redo log, in some embodiments.

Replication agent(s) 550 (e.g., 550d) may store log records to update a redo log of a mirror database volume 540b or store data pages to update the data pages 654 of mirror database volume 540b in different circumstances. For example, a threshold determination as to the number of changes (e.g., amount of data, number of operations or records, number of portions of the database to access, etc.) may determine whether replication agent 550d utilizes inter-storage service engine log replication, cached log records, stored log records, or data pages, in some embodiments. In some embodiments, replication agent(s) 550d may also implement a log cache (not illustrated) for performing updates (or providing updates to a secondary head node 520e that accesses mirror database volume 540b).

FIG. 5 depicts the various potential interruption scenarios that can occur in a ordered replication stream of log records. For example, a failure of either primary database instance 520a or of secondary database instances 520b and/or secondary database instance(s) 520e could cause an interruption in the stream. For mirrored databases in other regions, a failure of replication agent(s) 550a or 550d. Some interruptions may not be failures but occur as a result of upgrades or changes in software version or management operations which change or replace instances or other components (e.g., for heat). Networking failures, including network partitions internal to a region or failures in wide area network 560 can result in interruptions as well.

In various embodiments, buffer cache management (like buffer cache management 322 in FIG. 3) may be implemented as part of query engines 532a, 532b, and 532e. As discussed above with regard to FIG. 1 and below with regard to FIG. 6, buffer cache management can detect scenarios when log records are missing in an ordered replication stream. For example, when a secondary instance is disconnected from a primary instance, or when a replication agent is disconnected from the secondary instance, and then reconnection occurs, this event may trigger an analysis to determine missing log records in the ordered replication stream when new log records are received. Similarly, other operations, such as application upgrades, may trigger an evaluation to detect missing log records. In some embodiments, buffer cache management may monitor the ordered replication stream for gaps in LSNs or other indicators of missing records (e.g., control messages or other information shared by the primary instance). Individual determinations as to whether to apply a given log record or make a buffer cache page unavailable may be performed, as discussed below.

Figure 6:
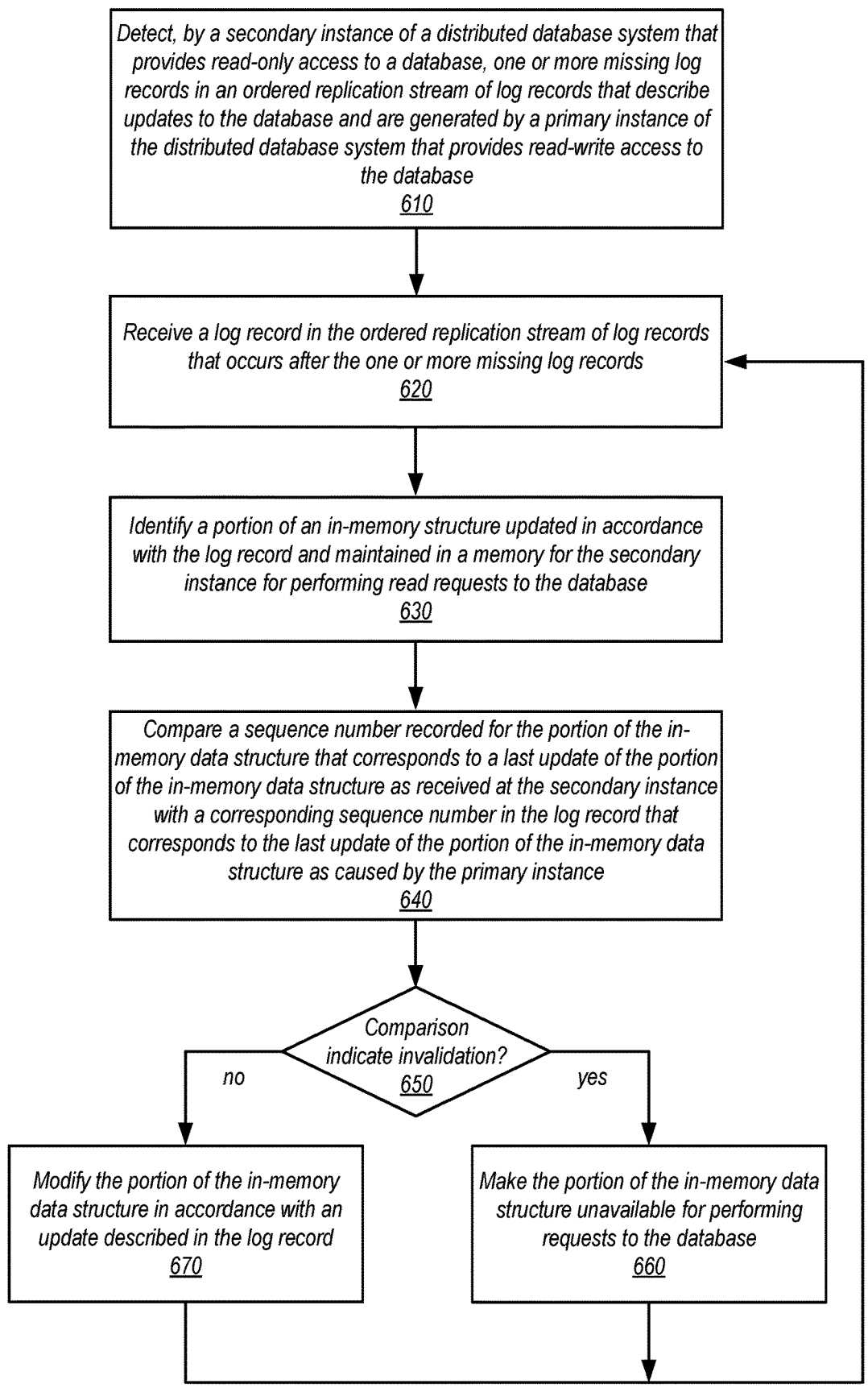
FIG. 6 is a high-level flowchart illustrating various methods and techniques to implement recovering from interruptions in database replication streams, according to some embodiments.

The database service and storage service discussed in FIGS. 2 through 5 provide examples of a system that may implement recovering from interruptions in database replication streams. However, various other types of distributed database systems (as discussed above with regard to FIG. 1) may implement these techniques. FIG. 6 is a high-level flowchart illustrating various methods and techniques to implement recovering from interruptions in database replication streams, according to some embodiments. Various different systems and devices of a distributed database system may implement the various methods and techniques described below, either singly or working together. For example, a control plane component of a distributed database system and/or a database instance may implement the various methods. Alternatively, a combination of different systems and devices may implement these techniques. Therefore, the above examples and or any other systems or devices referenced as performing the illustrated method, are not intended to be limiting as to other different components, modules, systems, or configurations of systems and devices.

As indicated at 610, one or more missing log records may be detected in an ordered replication stream of log records that describe updates to the database and are generated by a primary instance of the distributed database system that provides read-write access to the database, in some embodiments. For example, various events may trigger or cause the search for missing log records, such as component failures, reconnects, or software or application upgrades. In some embodiments, missing log records may be implemented as part of a monitoring technique that evaluates the ordered replication stream of log records by search for gaps in LSNs or other indictors of missing log records (e.g., log records that are chained to point back to or identify an immediately previous LSN even if the immediately previous LSN is not an immediately preceding value, which may be applicable in scenarios where LSN values are based on time or other values that are not monotonically increasing).

As indicated at 620, a log record may be received in the ordered replication stream of log records that occurs after the one or more missing log records, in some embodiments. The log record may be identified or determined as after the missing log records based on when the log record is received or based on the LSN value being greater than a range of unknown LSN values.

As indicated at 630, a portion of an in-memory data structure may be identified that is updated in accordance with the log record and maintained in a memory for the secondary instance for performing read requests to the database, in some embodiments. As noted above, various different in-memory data structures can be recovered, such as buffer cache, overlay, fileover, commit log, multi-transaction log, and commit timestamp metadata.

For example, in some embodiments, the in-memory data structure may be a buffer cache of data pages of a database. The identified portion may be a data page. In such an example, a page identifier or other identifying information may be included in the log record to determine the targeted data page.

In another example, the in-memory data structure may be overlay. Overlay may map the logical space of database volume to physical storage device block offsets. As changes to the database volume occur, the mapping or other geometry information may change. Log records may indicate changes to this overlay information (e.g., changing a portion of the overlay information).

In another example, the in-memory data structure may be fileover. Fileover may track the metadata about files such as name, size, reference count, directory, or other information that enables file access. Like overlay, as changes to the database volume occur, the tracking metadata may change. Log records may indicate changes to this fileover information (e.g., changing a portion of the overlay information, such as name, size, reference count, etc.).

In another example, the in-memory data structure may be a commit log. The commit log may be a write ahead log that describes database updates that are committed but not yet stored in data pages. The in-memory data structure may be cached version of some or all of the commit log. Log records may indicate changes to portions of the commit log.

In another example, the in-memory data structure may be multi-transaction log. Multi-transaction log maintain transaction information to support features such as row locking by multiple transactions in order to minimize the space used to store lock information. Log records may indicate changes to portions of the multi-transaction log. Similarly, another example of an in-memory data structure may be commit timestamps that are metadata to track the time of transaction commits. Log records may indicate changes to portions of the transaction commit times.

As indicated at 640, a comparison of a sequence number recorded for the portion that corresponds to a last update of the portion as received at the secondary instance may be made with a corresponding sequence number in the log record that identifies the last update of the portion as caused by the primary instance, in some embodiments. In some embodiments, the sequence number may be recorded in the portion itself (e.g., in a data page in a buffer cache). In some embodiments, the sequence number may be associated with recovery mapping structure that maps a current epoch of a handling a recovery that "jumps ahead" in the replication log by recording a safe sequence number (e.g., a read view sequence number). If the comparison indicates that the portion is valid (e.g., match or are less than), as indicated by the positive exit from 650, the portion in the memory can be modified according to the update described in the log record, in some embodiments, as indicated at 670. If, as indicated by the negative exit from 650 the comparison indicates that the portion is not valid, the portion of the in-memory data structure may be made unavailable for performing read requests, in some embodiments, as indicated at 660. For example, if the portion is a data page of a buffer cache of data pages, the data page may be marked as stale or for eviction. In some embodiments, a request may be queued, scheduled, or made to obtain the data page from the authoritative copy of the database (e.g., a storage volume in the region of the secondary instance).

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
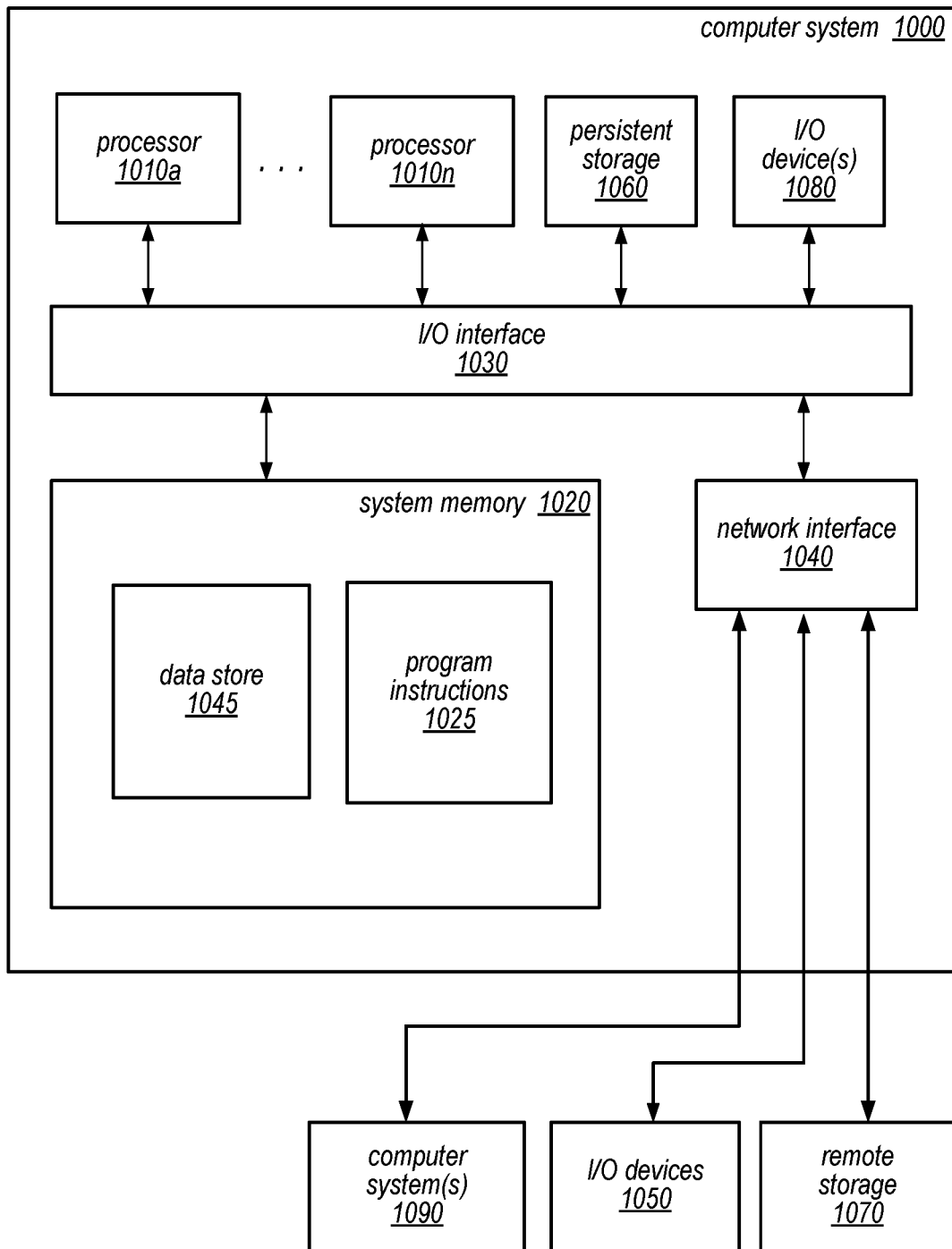
FIG. 7 is a block diagram illustrating an example computer system, according to various embodiments.

FIG. 7 is a block diagram illustrating an example computer system, according to various embodiments. For example, computer system 1000 may implement a read-write (or master/leader/primary) database instance, a read-only node (or read replica/secondary) database instance, replication agents, or storage nodes of a separate distributed storage system that stores database data or other components that may implement recovering from interruptions in database replication streams, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 7 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a secondary instance of a distributed database system, wherein the secondary instance of the distributed database system provides read-only access to a database, and wherein the secondary instance is configured to:
   detect one or more missing log records in an ordered replication stream of log records that describe updates to the database and are generated by a primary instance of the distributed database system that provides read-write access to the database;
   for a log record received in the ordered replication stream of log records that occurs after the one or more missing log records:
      identify a portion of an in-memory data structured updated by the log record and maintained in a memory at the secondary instance;
      compare a sequence number recorded for the portion of the in-memory data structure that corresponds to a last update of the portion of the in-memory data structure as received at the secondary instance with a corresponding sequence number in the log record that identifies the last update corresponding to the portion of the in-memory data structure caused by the primary instance;
      determine that the comparison of the sequence number recorded for the portion of the in-memory data structure and the sequence number in the log record indicate that the portion of the in-memory data structure is invalid; and
      make the portion of the in-memory data structure in the memory unavailable for performing requests to the database.

2. The system of claim 1, wherein the secondary instance is further configured to:
   for a different log record received in the ordered replication stream of log records that occurs after the one or more missing log records:
      identify a different portion of the in-memory data structure or a different in-memory data structure to be updated corresponding to the different log record;
      compare a sequence number recorded in the different portion that corresponds to a last update of the different portion of the in-memory data structure or the different in-memory data structure as received at the secondary instance with a corresponding sequence number in the different log record that identifies the last update of the different portion of the in-memory data structure or the different in-memory data structure as caused by the primary instance;

determine that the sequence number recorded in the different portion and the sequence number in the different log record indicate that the portion of the in-memory data structure of the different in-memory data structure is valid; and update the identified portion of in-memory data structure or the different in-memory data structure according to the different log record.

3. The system of claim 1, wherein the secondary instance is implemented in a secondary region and the primary instance is implemented in a primary region of a provider network.

4. The system of claim 1, wherein the distributed database system is a relational database service offered as part of a provider network, wherein the database is stored in a separate storage service offered by the provider network, and wherein both the primary instance and the secondary instance access the database in the separate storage service to perform at least some database access requests.

5. A method, comprising:
detecting, by a secondary instance of a distributed database system that provides read-only access to a database, one or more missing log records in an ordered replication stream of log records that describe updates to the database and are generated by a primary instance of the distributed database system that provides read-write access to the database;

for a log record received in the ordered replication stream of log records at the secondary instance that occurs after the one or more missing log records:
identifying, by the secondary instance, a portion of an in-memory data structure, updated by the log record and maintained in a memory for the secondary instance for performing read requests to the database;

comparing, by the secondary instance, a sequence number recorded for the portion of the in-memory data structure that corresponds to a last update of the portion as received at the secondary instance with a corresponding sequence number in the log record that corresponds to the last update of the portion caused by the primary instance;

determining that the sequence number recorded for the portion and the sequence number in the log record indicate that the portion is invalid; and making, by the secondary instance, the portion in the memory unavailable for performing requests to the database.

6. The method of claim 5, further comprising:
for a different log record received in the ordered replication stream of log records that occurs after the one or more missing log records:
identifying a different portion of the in-memory data structure or a different in-memory data structure in the memory to be updated corresponding to the different log record;

comparing a sequence number recorded for the different portion that corresponds to a last update of the different portion as received at the secondary instance with a corresponding sequence number in the different log record that corresponds to the last update of the different portion as caused by the primary instance;

determining that the sequence number recorded for the different portion and the sequence number in the different log record indicate that the different portion is valid according to the comparison; and updating the portion in the memory according to the different log record.

7. The method of claim 5, wherein the detecting of the one or more missing log records is triggered by reconnecting the secondary instance to a replication agent that provides the ordered replication stream to the secondary instance.

8. The method of claim 5, wherein the detecting of the one or more missing log records is triggered by a version upgrade performed at the secondary instance or the primary instance.

9. The method of claim 5, wherein the detecting of the one or more missing log records is performed as part of monitoring the ordered replication stream of log records for missing log records.

10. The method of claim 5, wherein the portion of the in-memory data structure is a data page of a buffer cache of data pages of the database and wherein the method further comprises scheduling a request to obtain the data page from a data store that persistently stores the database.

11. The method of claim 5, wherein the distributed database is a database service that is implemented across a plurality of regions offered by a provider network, and wherein the secondary instance is in a same region as the primary instance.

12. The method of claim 5, wherein the secondary instance is implemented in a secondary region and the primary instance is implemented in a primary region of a provider network.

13. The method of claim 12, wherein the distributed database system is a database service offered as part of the provider network, wherein the database is stored in a separate storage service offered by the provider network, and wherein both the primary instance and the secondary instance access respective copies of the database stored in the separate storage service in the primary region and the secondary region to perform at least some database access requests.

14. One or more non-transitory, computer-readable storage media, storing program instructions that when executed on or across one or more computing devices cause the one or more computing devices to implement:
detecting, by a secondary instance of a distributed database system that provides read-only access to a database, one or more missing log records in an ordered replication stream of log records that describe updates to the database and are generated by a primary instance of the distributed database system that provides read-write access to the database;

receiving a log record received in the ordered replication stream of log records at the secondary instance that occurs after the one or more missing log records;

identifying, by the secondary instance, a portion of an in-memory data structure, updated in accordance with the log record and maintained in a memory for the secondary instance for performing read requests to the database;

comparing, by the secondary instance, a sequence number recorded for the portion that corresponds to a last update of the portion as received at the secondary instance with a corresponding sequence number in the log record that identifies the last update of the portion as caused by the primary instance;

determining that the sequence number recorded in the portion in the memory and the sequence number in the log record indicate that the portion is invalid according to the comparison; and identifying, by the secondary instance, the portion in the memory as unavailable for performing read requests to the database.

15. The one or more non-transitory, computer-readable storage media of claim 14, storing further program instructions that when executed on or across the one or more computing devices cause the one or more computing devices to further implement:

for a different log record received in the ordered replication stream of log records that occurs after the one or more missing log records:

identifying a different portion of the in-memory data structure or another in-memory data structure in the memory to be updated by the different log record;

comparing a sequence number recorded in the different portion that corresponds to a last update of the different portion as received at the secondary instance with a corresponding sequence number in the different log record that identifies the last update of the different portion as caused by the primary instance;

determining that the sequence number recorded for the different portion and the sequence number in the different log record indicate that the different portion is valid according to the comparison; and updating the different portion in the memory according to the different log record.

16. The one or more non-transitory, computer-readable storage media of claim 14, wherein the detecting of the one or more missing log records is triggered by reconnecting the secondary instance to the primary instance.

17. The one or more non-transitory, computer-readable storage media of claim 14, wherein the detecting of the one or more missing log records is triggered by a version upgrade performed at the secondary instance or the primary instance.

18. The one or more non-transitory, computer-readable storage media of claim 14, wherein the detecting of the one or more missing log records is performed as part of monitoring the ordered replication stream of log records for missing log records.

19. The one or more non-transitory, computer-readable storage media of claim 14, storing further program instructions that when executed on or across the one or more computing devices cause the one or more computing devices to further implement sending a request to obtain the data page from a data store that persistently stores the database.

20. The one or more non-transitory, computer-readable storage media of claim 14, wherein the secondary instance is implemented in a secondary region and the primary instance is implemented in a primary region of a provider network.

* * * * *